Aug. 13, 1935.  W. W. SIMMONS, JR  2,010,932
SEALED VEHICLE BODY
Filed Dec. 5, 1932  2 Sheets-Sheet 1
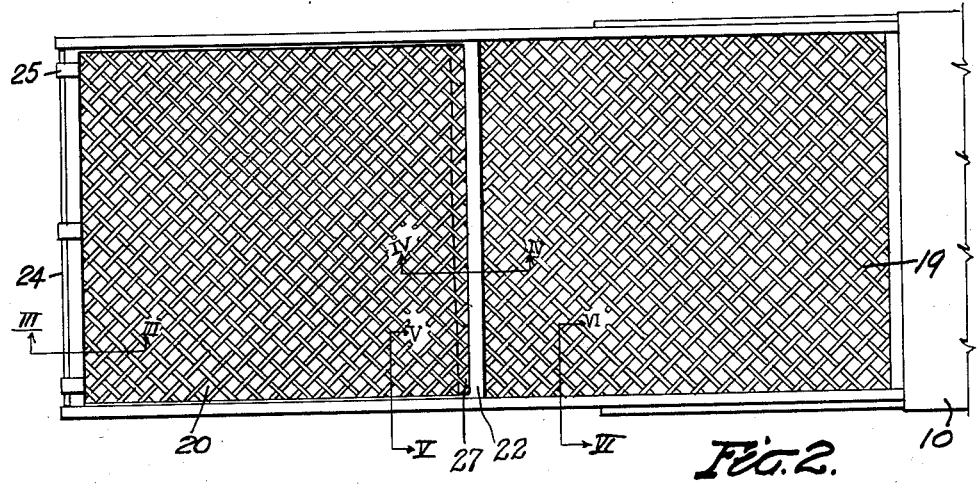
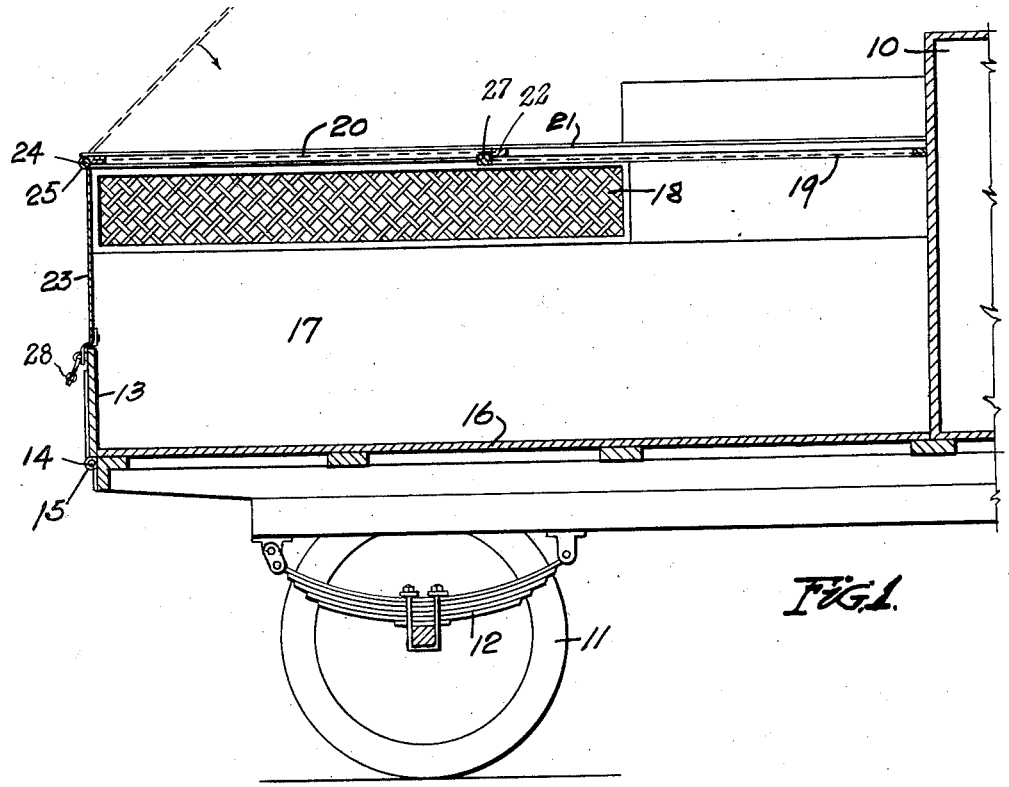
INVENTOR
WILLIAM W. SIMMONS JR
by J.H. Weatherford
ATTY.

Aug. 13, 1935.  W. W. SIMMONS, JR  2,010,932
SEALED VEHICLE BODY
Filed Dec. 5, 1932   2 Sheets-Sheet 2
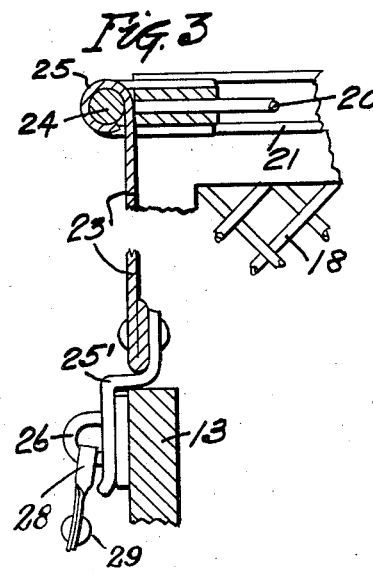
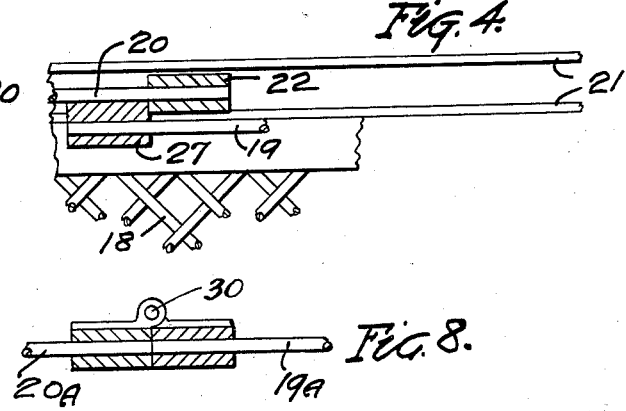
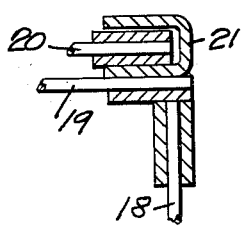
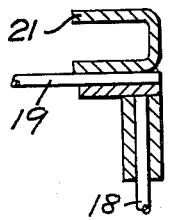
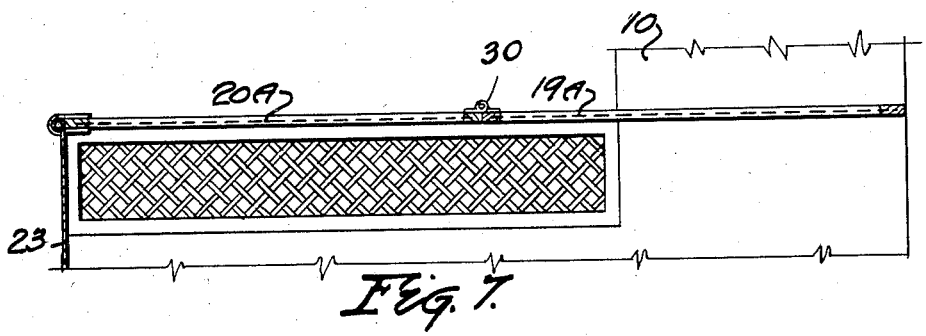
INVENTOR
WILLIAM W. SIMMONS JR.
by J. H. Weatherford
ATTY.

Patented Aug. 13, 1935

2,010,932

UNITED STATES PATENT OFFICE 2,010,932

SEALED VEHICLE BODY

William W. Simmons, Jr., Memphis, Tenn.

Application December 5, 1932, Serial No. 645,641

1 Claim. (Cl. 296—100)

This invention has general reference to vehicle bodies in which weighed, measured or otherwise-fixed, quantities of certain commodities are delivered from the vendor to the vendee, and which it is desired to protect against unauthorized access between the time and place of loading and the time and place of delivery. But more specific reference will be made hereinafter to vehicle bodies such as those of coal trucks, and the like which ordinarily receive their contents at the top of the body and discharge them at the rear end of the body; to means common to both a top closure member and an end closure member for preventing unauthorized access to the interior of such body either at the top or at the end; and, comprehensively, to a method for sealing such bodies.

Especially in the case of coal intended for domestic use, losses to purchasers between the point at which the load is weighed and the residence at which it is delivered, usually due either to surreptitious purloining from the truck or to dishonesty of the driver, not only are frequent and both annoying and expensive, but heretofore it has been found practically impossible to guard against them. My present invention contemplates equipping the truck with a slidable or hinged top closure member, in addition to the usual upwardly-slidable or outwardly-and-downwardly pivotally movable tail-board; providing securing means common to said top closure member and said tail-board for retaining both thereof in closed position; and applying to such retaining means a seal, preferably such as commonly is used for sealing the box car type of railway cars, so that access cannot be had to the interior of the truck, either at the top or at the end, without breaking such sealing means. When the truck has been loaded, and either before or at the time it and its load are weighed, the seal is applied, and is intended to remain unbroken until the truck reaches the place of delivery and the seal is broken in the presence of the purchaser or his authorized representative.

The primary object of the present invention is to provide a vehicle body to the interior of which access may be had through a plurality of openings, having a closure member for each of said openings, having means common to said closure members for retaining them in closed position, and such retaining means being adapted to receive a seal or the like, which must be broken or defaced before any one of said closure members can be moved to afford access to the interior of said body.

A further object is to provide a movable top closure member for a vehicle body having an open top, and having a lateral opening affording access to the interior of such body and a movable closure member for said opening, and to associate with said two closure members a single means for retaining them both in closed position, such means being adapted to receive a seal or the like which must be broken or defaced before either of said closure means can be moved toward open position.

And a still further object is to provide a method for preventing unauthorized access to the interior of a vehicle body having a plurality of openings thereinto, which consists in equipping such body with a movable closure member for each of said openings; associating with said closure members a single means for retaining them in closed position, and applying to said retaining means a seal or the like which must be broken or defaced before said retaining means can be operated to relieve said closure members for opening movement.

The means by which the foregoing and other objects are accomplished by my present invention, and the manner of their accomplishment, readily will be understood from the following description having reference to the accompanying drawings, in which:—

Fig. 1 is a sectional side elevation of the body portion of a vehicle having my improvements applied thereto.

Fig. 2 is a top plan view of the same.

Figs. 3, 4, 5 and 6 are enlarged broken sectional detail views, the sections respectively being taken on line III—III, line IV—IV, line V—V, and line VI—VI, of Fig. 2.

Fig. 7 is a broken sectional side elevation of a portion of an alternate form of vehicle body having a hinged top closure member, and having my improvements applied thereto.

Fig. 8 is an enlarged broken sectional detail view, the section being taken transversely of the rod upon which the top closure member of Fig. 7 is pivotable.

Referring first to Figs. 1 to 6, inclusive, the reference numeral 10 indicates the cab of the vehicle, which has the usual wheels 11 and springs 12 (only one of each of the latter being shown); said vehicle being of a type commonly used for transporting coal, and having the usual hinged tail board 13, which is pivotally movable outward and downward on a pivot-rod passing through hinges 16 secured at the rear end of the floor 16 of the vehicle body. The load-retaining portion of the truck body is indicated by the numeral 17, and since the side of truck bodies of this type frequently are higher at the forward end of the body than elsewhere, a grille or the like 18 is added to each side so as to render it uniform overall height throughout. The top of the vehicle body is closed by a stationary grille or screen member 19 and a similar member 20 which is slidable in substantially U-shaped guide member 21 mounted upon the respective sides of the vehicle body. Rearward movement of said slidable closure member is limited by so positioning the members 19 and 20 that the rear frame piece 27 of the grille or screen 19 is in position to be engaged by the forward frame piece 22 of the slidable closure member 20.

A rear-end closure member 23 is pivotally secured by a rod 24 to the rear edge of the member 20 by clips 25 so that when member 20 is in closed position the closure member 23 hangs substantially vertical, and a hasp 25, secured at the middle of the lower edge of said member, is in position to engage a staple 26 secured near the upper edge of the tail-board 13. A railway-type seal, comprising a metal strip 28 and a lead button 29 which upon being compressed secures the two end portions of said strip together, being employed for retaining hasp 25 against disengagement from the staple 26. Before access can be had to the interior of the truck body, either at the top or at the rear end, and before the tail-board 13 can be dropped to permit the contents of the body to be discharged therefrom, the seal must be broken and removed from the staple 26 so that the hasp 25 can be detached from said staple. When the member 20 is to be moved slidably forward so as to open the top of the vehicle body, the hinged member 23 may be swung upward and forward so that it will rest upon the grille or screen of the member 20.

In the alternate design of truck body shown in Figs. 7 and 8, the grille or screen member 20A is pivotally connected by means of hinges 30 with the stationary grille or screen member 19A, but otherwise the details of the body are substantially the same as those shown in the other figures of the drawings. Manifestly the grille or screen member 19, or 19A, may be made removable if complete opening of the top of the body is desired.

As will be evident from the foregoing description, the salient feature of my present invention resides in the provision of means and a method for preventing unauthorized removal of any portion of the contents of a vehicle body which is intended to receive its load through the top of such body, and to discharge it at the rear end. This sort of vehicle body is typified by trucks such as commonly are used for delivery of coal for domestic use, and, while the invention readily is adaptable to other forms of vehicle bodies, it is especially applicable to coal trucks.

A further important feature is to provide a top closure having a movable portion which is housed and supported in all positions, thus rendering it unnecessary to prop up or otherwise support such portion when it is opened to permit loading the vehicle and one which is thus inherently protected against accidental destruction or disarrangement consequent on carelessness of the operator.

Various changes in minor details of the vehicle body, the top and rear-end closures, and the closure-retaining means, doubtless readily will suggest themselves to those skilled in this art, and I therefore do not desire to have my invention limited to any details not specifically claimed.

Having now fully disclosed by invention, what I claim is:

A vehicle body having a bottom, sides, an inner end and a fixed member forming a closure for a portion only of the top, the remainder of said top and the outer end of said body being open to permit loading and unloading respectively of said body; an end member hingedly secured to the outer end of said bottom adapted to form a partial end closure for the body, a movable closure member to form a closure for the open portion of said top, an end closure member complementary to said hinged end closure and movably carried by the movable top closure member, said fixed top closure member and said movable top closure member carrying inter-engaging means limiting closure movement of the movable top closure member, and said end member which is carried by said movable top closure member being adapted to engage fixed portions of said body to prevent retrogressive movement thereof when said end closure members are secured together, and means to secure the end closure members together.

WILLIAM W. SIMMONS, Jr.